US012245010B2

(12) United States Patent
Huang

(10) Patent No.: US 12,245,010 B2
(45) Date of Patent: Mar. 4, 2025

(54) VOICE DEVICE AND VOICE INTERACTION METHOD THEREOF

(71) Applicant: MediaTek Singapore Pte. Ltd., Singapore (SG)

(72) Inventor: Wei Huang, Wuhan (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 429 days.

(21) Appl. No.: 17/719,720

(22) Filed: Apr. 13, 2022

(65) Prior Publication Data

US 2022/0369033 A1   Nov. 17, 2022

(30) Foreign Application Priority Data

May 14, 2021   (CN) .......................... 202110529498.0

(51) Int. Cl.
  *H04R 5/04*   (2006.01)
  *G10L 15/08*   (2006.01)
  *H04R 3/12*   (2006.01)
(52) U.S. Cl.
  CPC ................ *H04R 5/04* (2013.01); *G10L 15/08* (2013.01); *H04R 3/12* (2013.01); *G10L 2015/088* (2013.01)
(58) Field of Classification Search
  CPC .. H04R 5/04; H04R 3/12; G10L 15/08; G10L 2015/088
  See application file for complete search history.

(56) References Cited

U.S. PATENT DOCUMENTS

| 10,971,158 | B1* | 4/2021 | Patangay ................ H04L 67/10 |
| 2017/0140759 | A1 | 5/2017 | Kumar et al. |
| 2018/0204569 | A1 | 7/2018 | Nadkar |
| 2019/0130906 | A1 | 5/2019 | Kobayashi |
| 2019/0163527 | A1* | 5/2019 | Acharya ................ G06F 9/505 |
| 2019/0251960 | A1* | 8/2019 | Maker ................ G10L 21/0316 |
| 2020/0075018 | A1 | 3/2020 | Chen |

(Continued)

FOREIGN PATENT DOCUMENTS

| CN | 107731231 A | 2/2018 |
| CN | 107919123 A | 4/2018 |
| CN | 109949817 A | 6/2019 |

(Continued)

OTHER PUBLICATIONS

CN Office Action dated May 11, 2024 in Chinese application No. 202110529498.0.

(Continued)

*Primary Examiner* — Sonia L Gay
(74) *Attorney, Agent, or Firm* — McClure, Qualey & Rodack, LLP

(57) ABSTRACT

This application provides a voice device and a voice interaction method of the voice device. The voice device includes at least two voice modules, and the voice interaction method includes: determining the working statuses of the at least two voice modules, selecting one of the two voice modules to execute voice interaction based on preset principles and the working statuses of the at least two voice modules, and suspending the voice interaction of other voice module(s). This application can solve the problem of conflicts between multiple kinds of voice services in the same voice device.

15 Claims, 12 Drawing Sheets

(56) References Cited

U.S. PATENT DOCUMENTS

2020/0372907 A1\* 11/2020 Trufinescu .............. G10L 15/32

FOREIGN PATENT DOCUMENTS

| CN | 110322880 A | 10/2019 |
|----|-------------|---------|
| CN | 110335601 A | 10/2019 |
| CN | 112165640 A | 1/2021 |
| CN | 112291436 A | 1/2021 |
| CN | 112767931 A | 5/2021 |
| TW | 201701270 A | 1/2017 |

OTHER PUBLICATIONS

Chinese language office action dated May 20, 2022, issued in application No. TW 110129703.

\* cited by examiner

VOICE DEVICE AND VOICE INTERACTION METHOD THEREOF

CROSS REFERENCE TO RELATED APPLICATIONS

This application claims the priority of and the benefit of China Application No. 202110529498.0, filed on May 14, 2021, the entirety of which is incorporated by reference herein.

FIELD OF THE DISCLOSURE

The present invention is related to the technical field of a voice device, and in particular it is related to a voice interaction method and device for voice interaction.

DESCRIPTION OF THE RELATED ART

Currently, most voice devices only support one kind of voice service, for example, Xiaomi speakers only support Xiaomi voice service, Google alarm clock only supports Google voice service (i.e., GVS), and some modern smart vehicles only support Alex voice service (i.e., AVS) . . . . In this way, users can only use one kind of voice service on one voice device. If users want to use two or more voice services, they need to buy more than two devices.

In order to enable users to use two or more kinds of voice services on one voice device, at least two voice services can be loaded in the same voice device, but this may cause voice service conflicts.

BRIEF SUMMARY OF THE DISCLOSURE

The present invention provides voice interaction method and device for voice interaction to solve the problem of conflicts between multiple kinds of voice services in the same voice device.

In order to resolve the problem described above, the present invention provides a voice interaction method of a voice device. The voice device includes a switching module and at least two voice modules. The voice interaction method includes: determining the working statuses of the at least two voice modules; selecting one of the at least two voice modules to execute voice interaction and suspending the voice interaction of the remaining voice module(s) based on a preset principle and the working status of the at least two voice modules.

In order to resolve the problem described above, the present invention further provides a voice device. The voice device includes a recording device, a playback device, at least two voice modules, and a switching module. Each of the two voice modules is communicatively connected with the recording device and the playback device. The switching module is communicatively connected with the least two voice modules, the recording device, and the playback device to execute the above-mentioned method.

In order to resolve the problem described above, the present invention further provides a voice device. The voice device includes a recording device, a playback device and a processor. The processor is communicatively connected with the recording device and the playback device. The processor is configured to execute instruction to perform the above-mentioned method.

The voice device of the present invention can select one of multiple kinds of voice modules to execute voice interaction, and suspend the voice interaction of the remaining voice module(s) based on the respective working statuses of the voice modules corresponding to the multiple kinds of voice services. That is, the voice device can automatically determine the voice module for voice interaction based on the working statuses of the multiple kinds of voice modules, so the present invention can solve the problem of conflicts between the multiple kinds of voice services in the voice device, and there is no need for manual determination.

BRIEF DESCRIPTION OF THE DRAWINGS

The disclosure can be more fully understood by reading the subsequent detailed description with references made to the accompanying figures. It should be understood that the figures are not drawn to scale in accordance with standard practice in the industry. In fact, it is allowed to arbitrarily enlarge or reduce the size of components for clear illustration. This means that many special details, relationships and methods are disclosed to provide a complete understanding of the disclosure.

DETAILED DESCRIPTION OF THE DISCLOSURE

Certain words are configured to refer to specific elements in the specification and the claims. Those with ordinary knowledge in the technical field should understand that hardware manufacturers may use different terms to refer to the same component. The specification and the claims of the present invention do not use differences in names as a way to distinguish elements, but use differences in functions of elements as a criterion for distinguishing. The "comprise" and "include" mentioned in the entire specification and the claims are open-ended terms, so they should be interpreted as "including but not limited to". "Generally" means that within an acceptable error range, a person with ordinary knowledge in the technical field can solve the technical problem within a certain error range, and basically achieve the technical effect. In addition, the term "coupled" herein includes any direct and indirect electrical connection means. Therefore, if it is described in the text that a first device is coupled to a second device, it means that the first device can be directly electrically connected to the second device, or indirectly electrically connected to the second device through other devices or connecting means. The following descriptions are preferred ways to implement the present invention. The purpose is to illustrate the spirit of the present invention and not to limit the scope of protection of the present invention.

The following description is the best embodiment expected of the present invention. These descriptions are configured to illustrate the general principles of the present invention and should not be configured to limit the present invention. The protection scope of the present invention should be determined on the basis of referring to the scope of the claims of the present invention.

Currently, most voice devices only support one kind of voice services, for example, Xiaomi speakers only support Xiaomi voice service, Google alarm clock only supports Google voice service, and some modern smart vehicles only support Alex voice service . . . . In this way, users can only use one kind of voice services on one voice device. If users want to use two or more voice services, they need to buy more than two devices.

In order to enable users to use two or more voice services on one voice device, at least two voice services can be loaded in the same voice device, but this may cause voice service conflicts.

Figure 1:
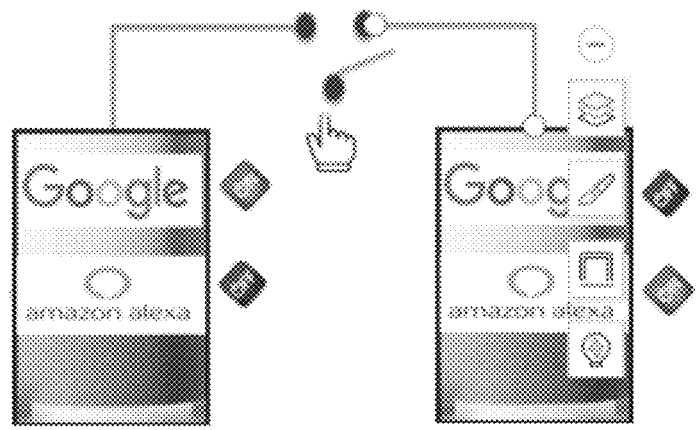
FIG. 1 is a structural schematic diagram of a traditional voice device in accordance with an implementation.

In order to solve the problem of conflicts between multiple kinds of voice services in the same voice device, currently, the on/off state of each voice service in the same voice device can be controlled by a button restart system, and the multiple kinds of voice services in the same voice device can be switched by the button restart system. Specifically, as shown in FIG. 1, when one voice service is controlled to be in the on state by the button restart system, the rest of the voice services are in the off state. Multiple kinds of voice systems in such a voice device with the button restart system cannot be alive at the same time, and also need to be manually switched to select the voice service to use.

Based on this, the present invention provides a voice device that does not need to manually switch voice services.

Figure 2:
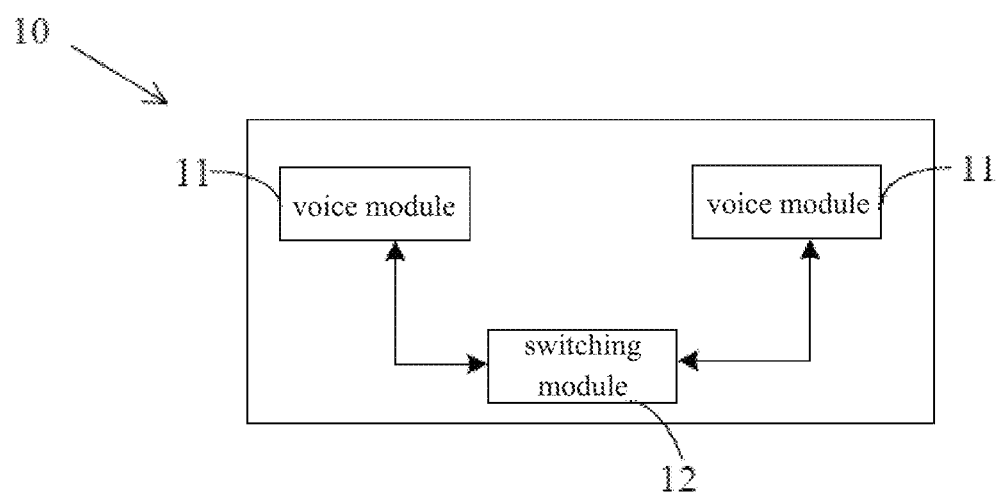
FIG. 2 is a structural schematic diagram of a voice device in accordance with some implementations of the present invention.

Specifically, as shown in FIG. 2, there is a switching module 12 in a voice device 10. The switching module 12 can select one of multiple voice modules 11 (for example, GVS (i.e., Google Voice Assistant) module or AVS (i.e., Alexa Voice Service) module) as the main voice module based on the respective working statuses of the voice modules 11 corresponding to the multiple kinds of voice services when there is a conflict between the multiple kinds of voice services in the voice device 10. The switching module 12 uses the remaining voice module(s) as backup voice service(s) and restricts the activities of the backup voice module(s), so that the voice device performs voice interaction through the main voice module. That is, the voice device 10 can automatically determine the voice module 11 for voice interaction with the user based on the operating conditions of the multiple voice modules 11, without manual determination.

Figure 3:
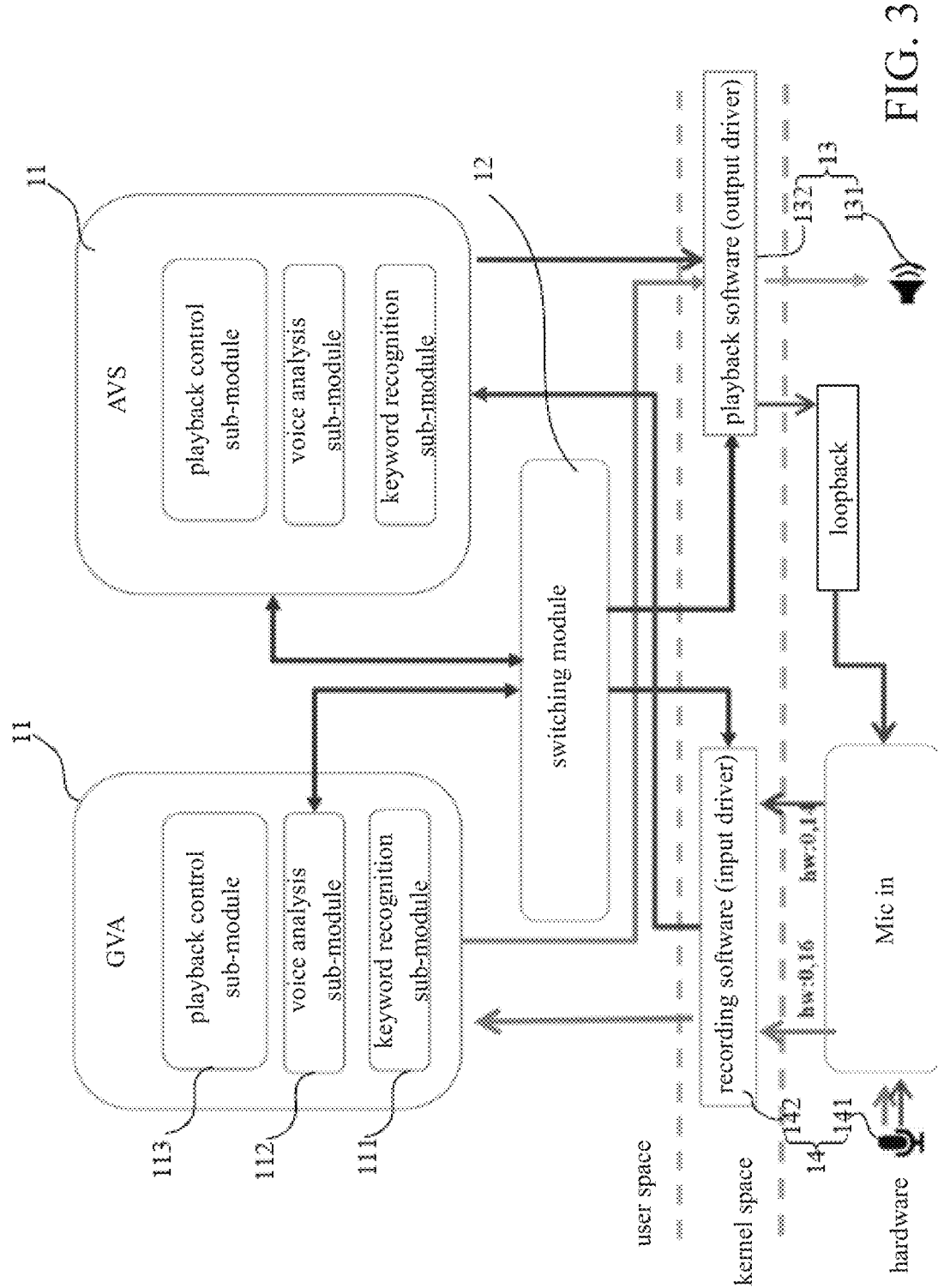
FIG. 3 is a structural schematic diagram of a voice device in accordance with some implementations of the present invention.

The specific structure of the voice device 10 may be as shown in FIG. 3. The voice device 10 includes a recording device 14, a playback device 13, a switching module 12, and at least two voice modules 11.

The recording device 14 may include a recording hardware 141 (microphone or earphone, etc.) and a recording software 142 (input driver). The playback device 13 may include a playback hardware 131 (speaker or earphone, etc.) and a playback software 132 (output driver).

Each voice module 11 integrates a kind of voice service, and different voice modules 11 integrate different kinds of voice services. Each voice module 11 is communicatively connected with the recording device 14 and the playback device 13, so that each voice module 11 can obtain the voice collected by the recording device 14 from the recording device 14, and can send its own playback content (for example, the reply content in response to the user's request) to the playback device 13, so that the playback device 13 can play.

Each voice module 11 can be integrated with a keyword recognition sub-module 111, a voice analysis sub-module 112, and a playback control sub-module 113. When each voice module 11 obtains the collected voice from the recording device 14, the keyword recognition sub-module 111 performs keyword recognition on the collected voice. If the keyword recognition sub-module 111 recognizes a keyword/keywords from the collected voice (for example, recognizes the keyword "Google" from "OK, Google! What's the time"), it will send the collected voice to the voice analysis sub-module 112. When the keyword recognition sub-module 111 recognizes the keyword/keywords, the working status of the voice module 111 can be changed from a standby state (IDLE) to a wake-up state (Hotword). The voice analysis sub-module 112 performs voice analysis on the collected voice. When the voice analysis sub-module 112 performs voice analysis on the collected voice, the working status of the voice module 11 can be changed from the wake-up state (Hotword) to an analysis state (Detecting). If the voice analysis sub-module 112 completes the analysis of the collected voice, the playback control sub-module 113 will send the playback content (for example, the reply content in response to the user's request) to the playback device 13 to play. At this time, the working status of the voice module 11 changes from the analysis state (Detecting) to a feedback state (Responding). When the playback device 13 finishes playing the content of the voice module 11, the state of the voice module 11 becomes the standby state again.

When there is a conflict between multiple kinds of voice services in the voice device 10, or when the working status of at least one voice module 11 changes, the switching module 12 is configured to select one voice module from multiple voice modules 11 for voice interaction and suspend the voice interaction of the remaining voice module(s) based on a preset principle and the working statuses of the voice modules 11 corresponding to the multiple kinds of voice services. Therefore, conflicts between multiple kinds of voice services in the same voice device 10 are avoided.

Suspending the voice interaction of a voice module may refer to: when the user issues a voice instruction to the voice device, the voice device will not reply to the user through the suspended voice module. The method of suspending the voice interaction of the remaining voice module(s) is not limited, as long as the purpose is achieved. For example, pausing/interrupting/stopping the work of the remaining voice module(s) (exemplarily, let the remaining voice module(s) pause to perform keyword recognition on the voice collected by the recording device 14, or let the remaining voice module(s) pause to send their own playback content to the playback device 13); not playing the playback content of the remaining voice module(s) (for example, pausing/stopping playing the playback content of the related voice module(s), or muting the playback content of the related voice module(s)); restoring the remaining voice module(s) to the standby state; keeping the current state of the remaining voice module(s); caching the playback content of the remaining voice module(s); not providing the collected voice to the remaining voice module(s); or disconnecting the remaining voice module(s), etc. The choice of these suspending methods may be slightly different in different scenarios.

Optionally, the switching module 12 is communicatively connected with each voice module 11, the switching module 12 can obtain working status information from each voice module 11, so that the switching module 12 selects one voice module 11 for voice interaction based on the working statuses of the multiple voice modules 11 and suspends the voice interaction of the remaining voice modules 11. In addition, the switching module 12 may also send instructions to the voice module 11 so that the voice module 11 executes operations corresponding to the instructions. For example, the switching module 12 may send an instruction to restore the standby state to the voice module 11, so that the corresponding voice module 11 stops the current work and returns to the standby state. For example, the switching module 12 may send a pause instruction to the voice module 11, so that the corresponding voice module 11 suspends the current work (for example, maintains the corresponding working status). For example, the switching module 12 may send a work continuation instruction to the voice module 11, so that the corresponding voice module 11 restores the previous work (for example, start from the current working status and continue to perform the subsequent working status/statuses).

The switching module 12 is communicatively connected to the playback device 13. The switching module 12 can send various control instructions to the playback device 13, for example, an instruction to play the playback content of at least one voice module 11, an instruction not to play the playback content of the at least one voice module 11 (for example, an instruction to pause/stop playing the playback content of the at least one voice module 11, an instruction to mute the playback content of the at least one voice module 11). Another example is an instruction to restore playing the playback content of the at least one voice module 11 (for example, an instruction to continue playing the playback content of the at least one voice module 11, or an instruction to unmute the playback content of the at least one voice module 11). In the case that the playback device 13 obtains an instruction not to play the playback content of a certain voice module from the switching module 12 (for example, not to play the playback content of the AVS voice module), even if the playback device 13 obtains the playback content of the voice module, the playback device 13 will not play it. For the playback device 13, the priority order of the instructions issued by the switching module 12 is higher than the priority order of the instructions issued by the voice module 11.

The switching module 12 can be communicatively connected with the recording device 14. The switching module 12 can send various control instructions to the recording device 14. For example, an instruction not to send the collected voice to specific voice modules. For example, an instruction not to send the collected voice to the AVS voice module. In this way, the recording device 14 only sends the collected voice to the other voice modules 11 in the voice device 10 except for the specific voice module, in response to the instruction not to send the collected voice to specific voice modules. In addition, the switching module 12 can also send an instruction to the recording device 14 to only send the collected voice to a specific voice module, for example, "send the collected voice to the AVS voice module", so that the recording device 14 can only send the currently collected voice to the AVS voice module.

In addition, the voice device 10 of the present invention may further include an echo cancellation module, and the echo cancellation module is configured to perform echo cancellation on the collected voice of the playback device 13.

In some embodiments, the echo cancellation module can be integrated in the voice module 11 (for example, in the keyword recognition sub-module 111), and each voice module 11 can be integrated with an echo cancellation module, so that after the voice module 11 obtains the collected voice, the voice module 11 will perform echo cancellation on the collected voice to ensure that the voice module 11 can accurately confirm whether there are keywords in the collected voice and perform voice analysis to ensure the quality of voice interaction.

In some embodiments, the echo cancellation module can be integrated in the recording device 14. Every time the recording device 14 collects a segment of voice, the echo cancellation module in the recording device 14 can perform echo cancellation on the collected voice, and the recording device 14 sends the collected voice after echo cancellation to the voice module 11. In order to ensure the quality of echo cancellation, the playback device 13 can send the playback content to the echo cancellation module, so that the echo cancellation module performs echo cancellation on the collected voice based on the playback content.

Figure 4:
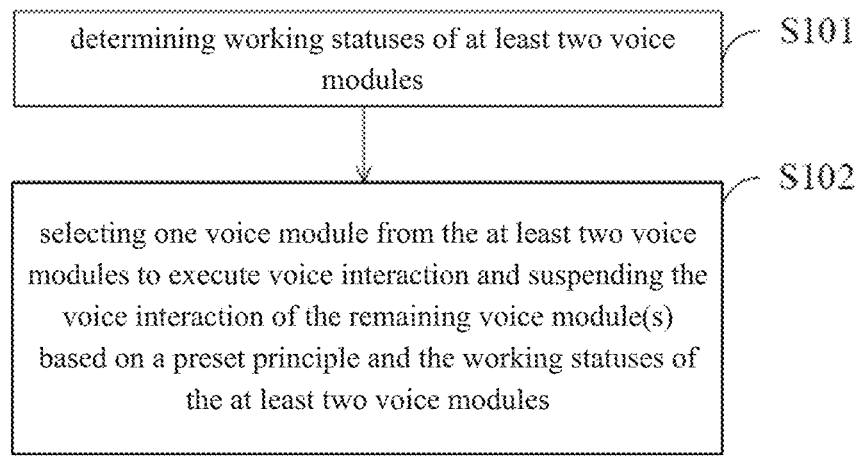
FIG. 4 is a flow chart of a voice interaction method of a voice device in accordance with some implementations of the present invention.

The voice interaction method of the above-mentioned voice device 10 will be described in detail below. A flow chart of a voice interaction method of the voice device in accordance with some implementations of the present invention is specifically shown in FIG. 4, and the voice interaction method of the voice device in this embodiment includes the following steps. It should be noted that the following step numbers are only configured to simplify the description, and are not intended to limit the execution order of the steps. The steps in this embodiment can be arbitrarily replaced without violating the technical idea of the present invention.

Step S101: determining working statuses of at least two voice modules.

The voice interaction method of the present invention first determines the working statuses of the at least two voice modules in the voice device, so that the voice interaction method of the present invention selects one of the voice modules for voice interaction and suspends the voice interaction of the remaining voice module(s) based on a preset principle and the working statuses of the at least two voice modules.

Optionally, when the working status of a voice module changes, the voice module can inform the switching module of its changed working status, so that the switching module knows the real-time working status of each voice module.

In some embodiments, the switching module can inquire each voice module about the working status of each voice module at regular intervals.

Therefore, the step S101 described in the embodiment may occur when the working status of any voice module changes, or may occur at a time point when the switching module periodically inquires the working status of each voice module.

The working status of a voice module can include a standby state (IDLE), a wake-up state (Hotword), an analysis state (Detecting), and a feedback state (Responding), etc.

Step S102: selecting one of the voice modules to execute voice interaction and suspending the voice interaction of the remaining voice module(s) based on a preset principle and the working statuses of the at least two voice modules.

After determining the working statuses of at least two voice modules, the switching module can select one of the voice modules to execute voice interaction and suspends the voice interaction of the remaining voice module(s) based on the preset principle and the working statuses of the at least two voice modules.

Optionally, the method of suspending the voice interaction of the remaining voice module(s) includes but is not limited to at least one of the following methods: pausing/interrupting/stopping the work of the remaining voice module(s) (for example, suspending the keyword recognition of the voice collected by the recording device); controlling the playback device not to play the playback content of the remaining voice module(s) (for example, pausing/stopping playing the playback content of the related voice module(s), or muting the playback content of the related voice module(s)); restoring the remaining voice module(s) to the standby state; keeping the current statuses of the remaining voice module(s); caching the playback content of the remaining voice module(s); controlling the recording device not to provide collected voice to the remaining voice module(s); and disconnecting the remaining voice module(s), etc. The selection of these suspending actions may be slightly different in different scenarios.

It is understandable that when all voice modules are in normal working conditions, all voice modules can obtain collected voice from the recording device, and can perform keyword recognition on the collected voice, so that when the user uses a voice service, the voice module corresponding to the voice service can respond in time.

In addition, in some embodiments, when the working status of the voice module selected for voice interaction becomes the feedback state or the standby state, the voice interaction of the other suspended voice module(s) can be restored to normal operation. The restoration of normal operation includes, but is not limited to: restoring the work of the other voice module(s) (for example, restoring keyword recognition of the collected voice of the recording device, restoring the normal state transition process); controlling the playback device to play the playback content of the other voice module(s); and controlling the recording device to provide the collected voice to the other voice module(s), etc. In this way, the remaining voice module(s) that restore normal operation can respond to the constraints of various preset principles provided by the present invention again. When the working status of the voice module selected for voice interaction changes to the feedback state, the voice interaction of the other suspended voice module(s) will restore normal operation, so that multiple voice services of the voice modules can be operated at the same time for a short period of time (for example, while the selected voice module performs voice broadcast, the restored voice module can normally monitor the user's voice instructions; or while the selected voice module performs voice broadcast, the restored voice module can perform keyword analysis normally, etc.), which can improve the operating efficiency of the voice device.

In some embodiments, the voice device of the present invention can select one of multiple kinds of voice modules to execute voice interaction, and suspend the voice interaction of the remaining voice module(s) based on the respective working statuses of the voice modules corresponding to the multiple kinds of voice services. That is, the voice device can automatically determine the voice module for voice interaction based on the working statuses of the multiple kinds of voice modules, so the present invention can solve the problem of conflicts between the multiple kinds of voice services in the voice device, and there is no need for manual determination.

Optionally, corresponding to different scenarios, different preset principles can be set, that is, in specific implementation, the voice device can implement one or more of the preset principles of the present invention. The following content will describe in detail four preset principles. As an example, the voice device only implements one of the preset principles at the same time. In addition, the voice device can be switched between different preset principles. Usually, the switching time point is preferably when all the voice modules are in the IDLE state. For example, in a first period, the voice device can implement first call first response principle. In a second period, the voice device can switch to implement call interruption principle. And in a third period, the voice device can switch to implement non-interruptible analysis principle. In a fourth period, the voice device can switch to step-by-step response principle. When to implement the preset principle/principles can be freely set by users.

Figure 5:
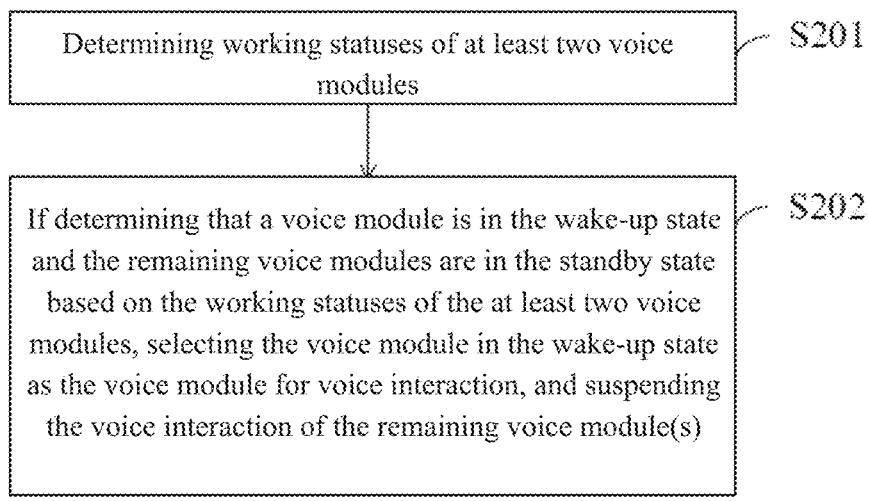
FIG. 5 is a flow chart of a voice interaction method of a voice device in accordance with some implementations of the present invention.
Figure 6:
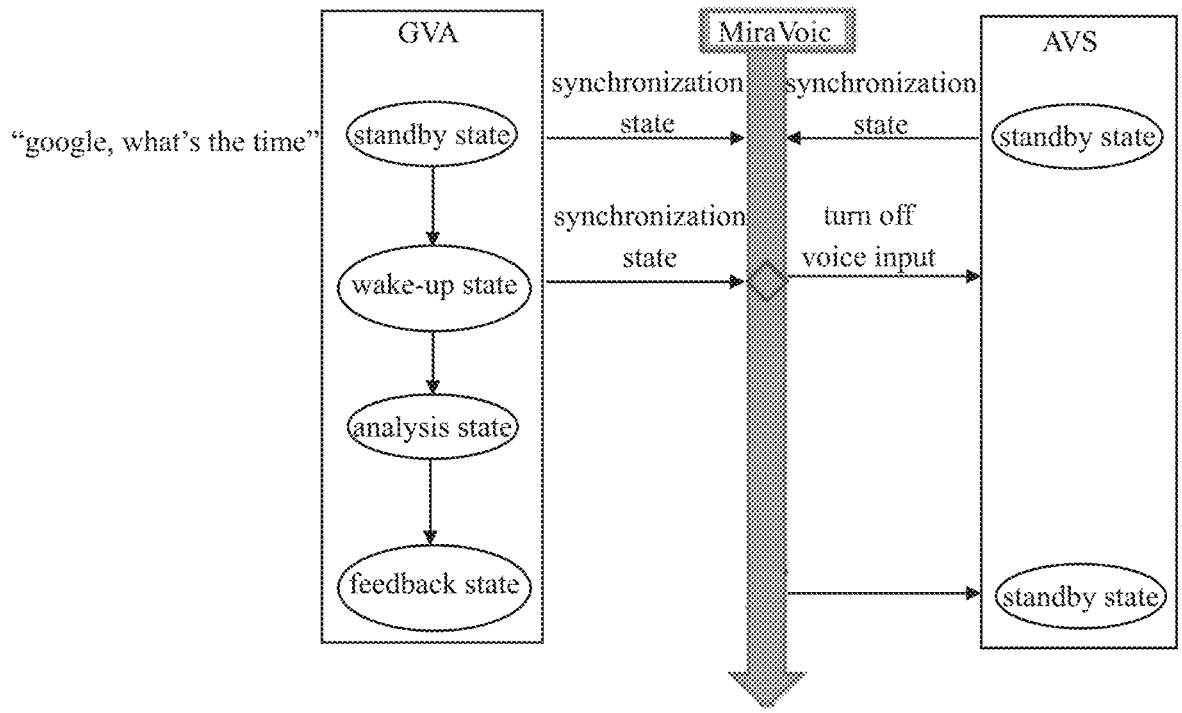
FIG. 6 is a principle schematic diagram of a voice interaction method of a voice device in accordance with some implementations of the present invention.

The following will introduce in detail the first preset principle—the first call first response principle, as shown in FIG. 5 to FIG. 6. The voice interaction method of a voice device in this embodiment includes the following steps. It should be noted that the following step numbers are only configured to simplify the description, and are not intended to limit the execution of the steps. The steps in this embodiment can be arbitrarily replaced without violating the technical idea of the present invention.

Step S201: determining working statuses of at least two voice modules.

Step S202: if determining that a voice module is in the wake-up state and the remaining voice modules are in the standby state based on the working statuses of the at least two voice modules, selecting the voice module in the wake-up state as the voice module for voice interaction, and suspending the voice interaction of the remaining voice module(s).

As mentioned above, optionally, when the working status of a voice module changes, the voice module can inform the switching module of its changed working status, so that the switching module knows the real-time working status of each voice module. In addition, in some embodiments, the switching module can inquire each voice module about the working status of each voice module at regular intervals.

Therefore, the step S201 in the embodiment can occur when the working status of any voice module changes, or can occur at a time point when the switching module periodically inquires the working status of each voice module.

The working status of a voice module can include a standby state (IDLE), a wake-up state (Hotword), an analysis state (Detecting), and a feedback state (Responding), etc.

In some embodiments, the method of suspending the voice interaction of a voice module may include at least one of the following methods: controlling the playback device not to play the playback content of the voice module (for example, pausing/stopping playing the playback content provided by the voice module, or muting the playback content provided by the voice module); keeping the voice module in the standby state; controlling the recording device not to provide the collected voice to the voice module; disconnecting the voice module, etc.

As shown in FIG. 6, a user first uses the GVA voice service, so the GVA voice service will be responded first, and if the user first uses the AVS voice service, then the AVS voice service will be responded first. That is, the voice module that enters the wake-up state (Hotword) first is used as the voice module for voice interaction and the voice services of other voice modules are suspended based on who first enters the wake-up state. In the embodiment of FIG. 6, as an example, the GVA voice module first enters the wake-up state. Therefore, in this embodiment, the switching module (marked as MiraVoice in FIG. 6) uses the GVA voice module as the voice module for voice interaction, and suspends the voice interaction of the AVS voice module. And as an example, the way to suspend the AVS voice module in FIG. 6 is to keep the AVS voice module in the standby state.

Optionally, in some embodiments, when the working status of the selected voice module (for example, the GVA voice module in FIG. 6) changes to the feedback state or the standby state, the voice interaction of the remaining voice module(s) can be restored to normal operation. In some embodiments, the restoration of normal operation of a voice module includes, but is not limited to: restoring the work of the voice module (for example, enabling the voice module to perform the state transition process normally); controlling the playback device to play the playback content of the voice module; controlling the recording device to provide the collected voice to the voice module, etc. In this way, the remaining voice modules that are restored to normal operation can respond to the constraints of various preset principles provided by the present invention again.

Figure 7:
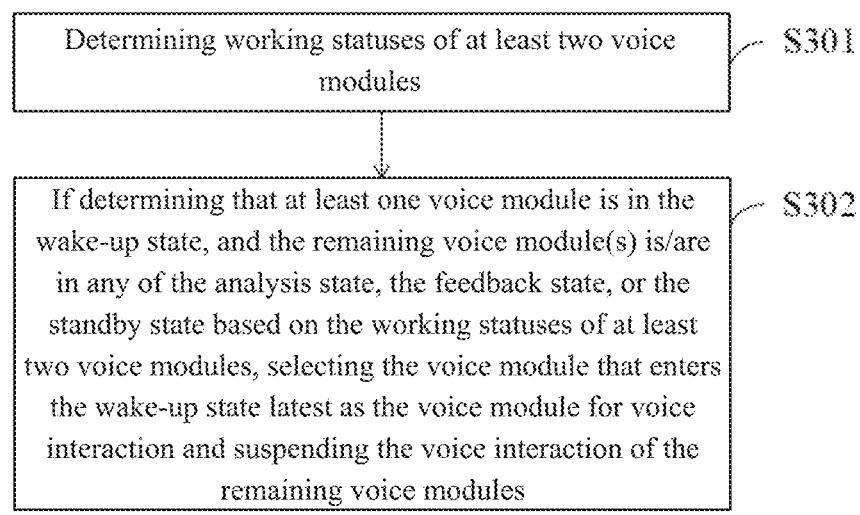
FIG. 7 is a flow chart of a voice interaction method of a voice device in accordance with some implementations of the present invention.

The second preset principle—the call interruption principle, will be introduced in detail below, as shown in FIG. 7, FIG. 8, FIG. 9, and FIG. 10. As shown in FIG. 7, the voice interaction method of a voice device in this embodiment includes the following steps. It should be noted that the following step numbers are only configured to simplify the description, and are not intended to limit the execution order of the steps. The steps in this embodiment can be arbitrarily replaced without violating the technical idea of the present invention.

Step S301: determining working statuses of at least two voice modules.

Step S302: if determining that at least one voice module is in the wake-up state, and the remaining voice module(s) are in any of the analysis state, the feedback state, or the standby state based on the working statuses of at least two voice modules, selecting the voice module that enters the wake-up state latest as the voice module for voice interaction and suspending the voice interaction of the remaining voice modules.

As mentioned above, optionally, when the working status of a voice module changes, the voice module can inform the switching module of its changed working status, so that the switching module knows the real-time working status of each voice module. In addition, in some embodiments, the switching module can inquire each voice module about the working status of each voice module at regular intervals. Therefore, the step S301 in this embodiment may occur when the working status of any voice module changes, or may occur at a time point when the switching module periodically inquires about the working status of each voice module.

The working status of a voice module can include a standby state (IDLE), a wake-up state (Hotword), an analysis state (Detecting), and a feedback state (Responding), etc.

In some embodiments, the suspension of a voice module may include at least one of the following methods: pausing/interrupting/stopping the work of the voice module (for example, suspending the keyword recognition of the collected voice of the recording device); controlling the playback device not to play the playback content of the voice module (for example, pausing/stopping playing the playback content provided by the voice module, or muting the playback content provided by the voice module); restoring the voice module to the standby state; keeping the current state of the voice module; controlling the recording device not to provide collected voice to the voice module; and disconnecting the voice module, etc. In the specific implementation, the appropriate suspension action can be selected according to the actual application scenario. In the specific implementation, when the remaining voice modules are all in the standby state, this embodiment becomes the aforementioned first preset principle.

Figure 8:
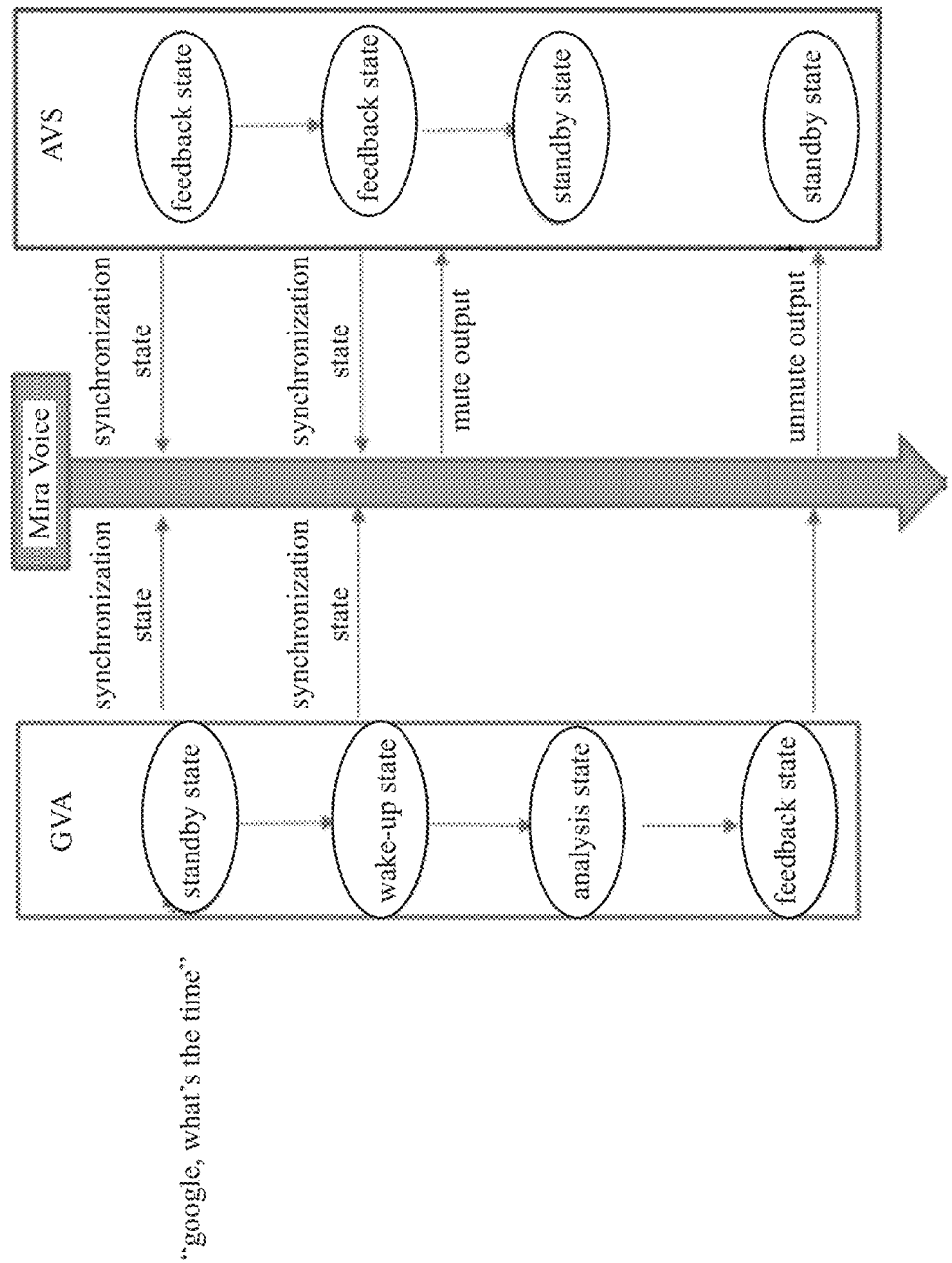
FIG. 8 is a principle schematic diagram of a voice interaction method of a voice device in accordance with some implementations of the present invention.

As shown in FIG. 8, a user first uses the AVS voice service, so the AVS voice service will be responded first. In some embodiments, when the AVS voice service is in the feedback state (Responding), the GVA voice service enters the wake-up state (Hotword), the switching module (marked as MiraVoice in FIG. 8) uses the GVA voice module as the voice module for voice interaction and suspends (interrupts) the playback of the AVS voice service in response to the GVA voice service entering the wake-up state. In the embodiment of FIG. 8, as an example, the way to suspend the AVS voice service is to restore the AVS voice module to the standby state and control the playback device not to play the playback content of the AVS voice module (for example, pausing/stopping playing the playback content provided by the voice module, or muting the playback content provided by the voice module).

Figure 9:
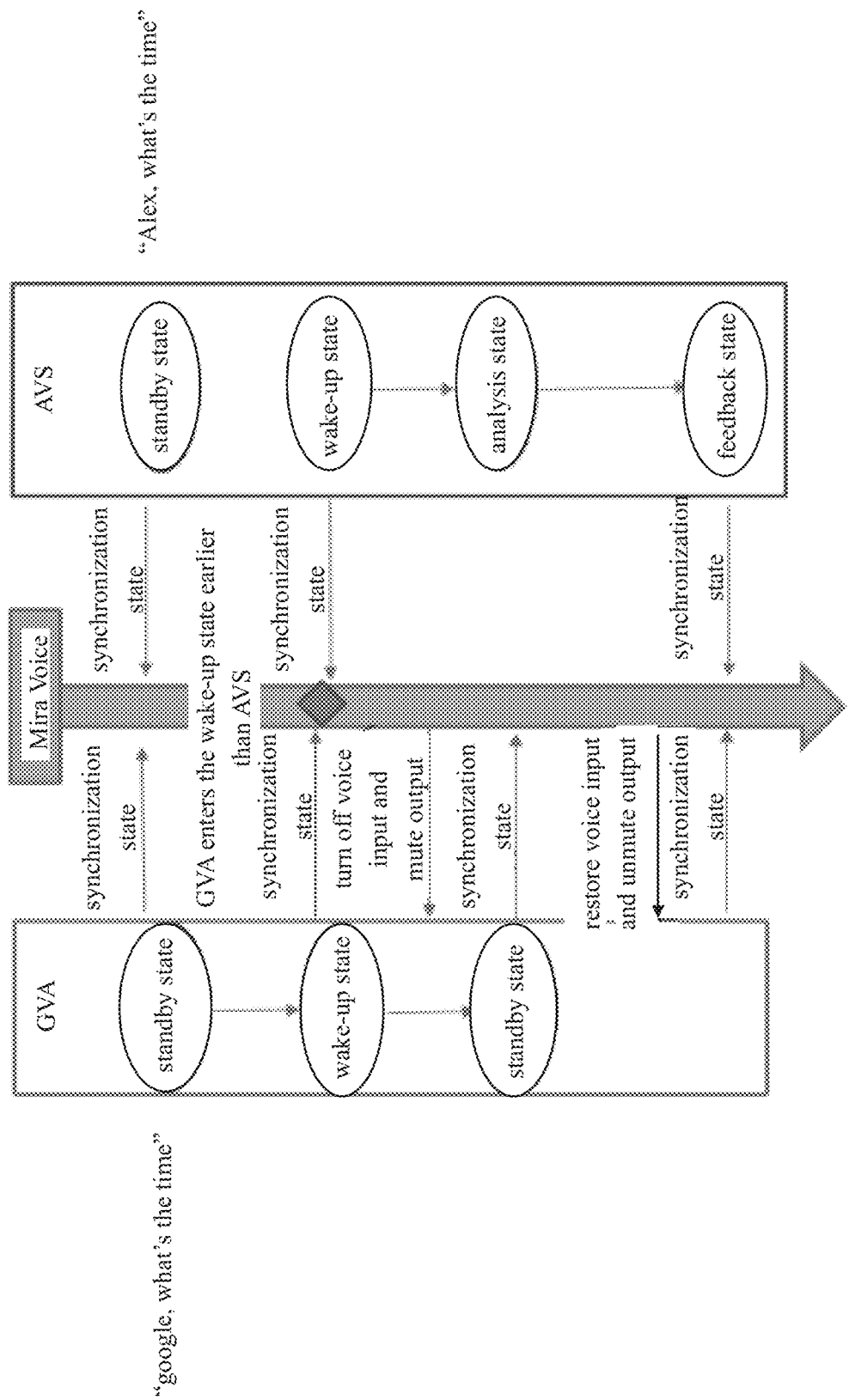
FIG. 9 is a principle schematic diagram of a voice interaction method of a voice device in accordance with some implementations of the present invention.

As shown in FIG. 9, a user uses the GVA voice service first, so the GVA voice service will be responded first. In some embodiment, when the GVA voice service is in the wake-up state (Hotword), the AVS voice service enters the wake-up state (Hotword), the switching module (marked as MiraVoice in FIG. 9) uses the AVS voice module as the voice module for voice interaction and suspends (interrupts) the GVA voice service, in response to the AVS voice module being the latest voice module that has entered the wake-up state. In the embodiment of FIG. 9, as an example, the way to suspend the GVA voice service is to restore the GVA voice module to the standby state and control the playback device not to play the content of the GVA voice module (for example, pausing/stopping the playback content provided by the voice module, or muting the playback content provided by the voice module), and control the recording device not to provide the collected voice to the GVA voice module.

Figure 10:
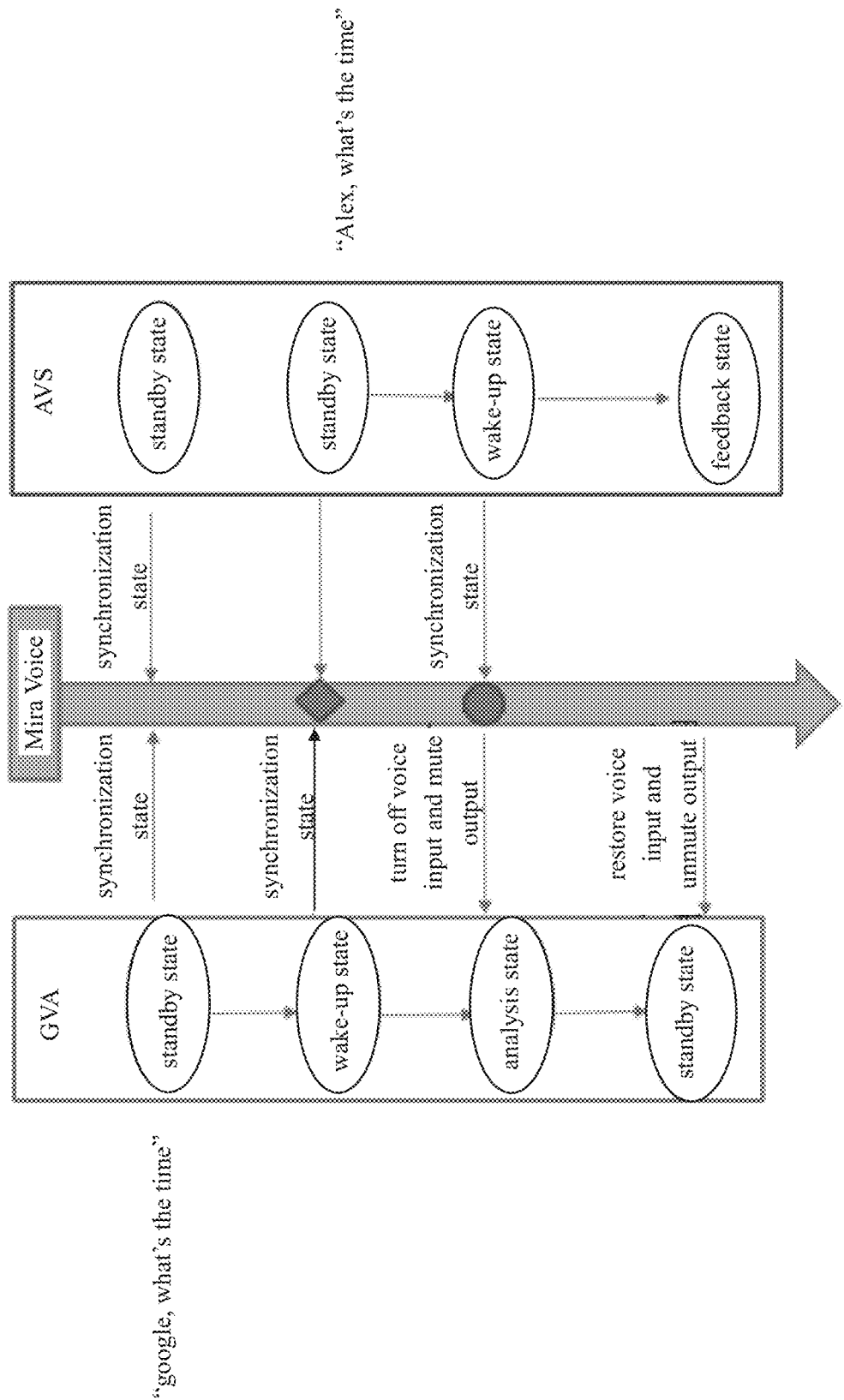
FIG. 10 is a principle schematic diagram of a voice interaction method of a voice device in accordance with some implementations of the present invention.

As shown in FIG. 10, a user uses the GVA voice service first, the GVA voice service will be responded first. In some embodiments, when the GVA voice service is in the analysis state (Detecting), the AVS voice service enters the wake-up state (Hotword), the switching module (marked as Mira-Voice in FIG. 10) uses the AVS voice module as the voice module for voice interaction and suspends (interrupts) the original GVA voice service, in response to the AVS voice service entering the wake-up state. In the embodiment of FIG. 10, as an example, the way to suspend the GVA voice service is to disconnect the GVA voice module and control the playback device not to play the playback content of the GVA voice module (for example, pausing/stopping playing the playback content provided by the voice module, or muting the playback content provided by the voice module), and control the recording device not to provide the collected voice to the GVA voice module.

Optionally, in the call interruption principle, when the working status of the selected voice module (for example, the GVA voice module in FIG. 8, the AVS voice module in FIG. 9 and FIG. 10) changes to the feedback state or the standby state, the voice interaction of the remaining voice modules (for example, the AVS voice module in FIG. 8, the GVA voice module in FIG. 9 and FIG. 10) can be restored to normal operation. In the embodiment of FIG. 8, as an example, the way to restore the normal operation of the AVS voice module is to enable the AVS voice module to perform various state switching normally and control the playback device to play the playback content of the AVS voice module. In the embodiment of FIG. 9, as an example, the way to restore the normal operation of the GVA voice module is to enable the GVA voice module to perform various state switching normally, control the playback device to play the playback content of the GVA voice module, and control the recording device to provide the collected voice to the GVA voice module. In the embodiment of FIG. 10, as an example, the way to restore the normal operation of the GVA voice module is to reconnect the GVA voice module and control the playback device to play the playback content of the GVA voice module, and control the recording device to provide the collected voice to the GVA voice module. In this way, the remaining voice modules in a normal operating state can respond to the constraints of various preset principles provided by the present invention again.

Figure 11:
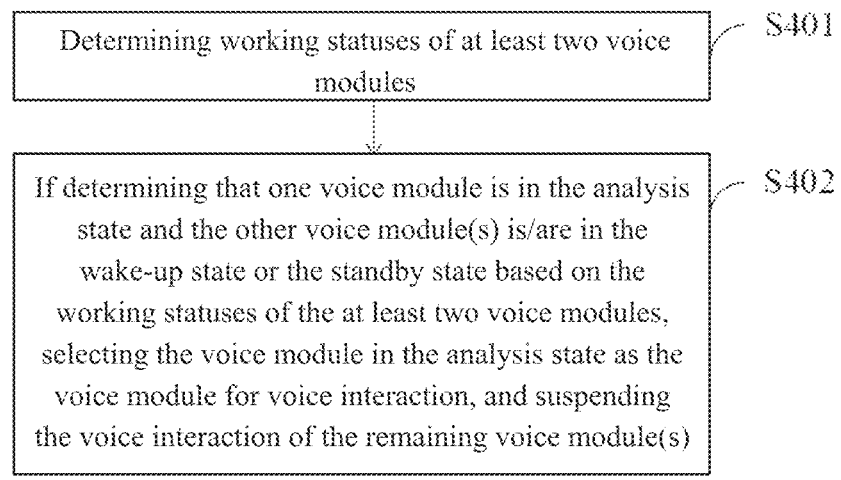
FIG. 11 is a flow chart of a voice interaction method of a voice device in accordance with some implementations of the present invention.
Figure 12:
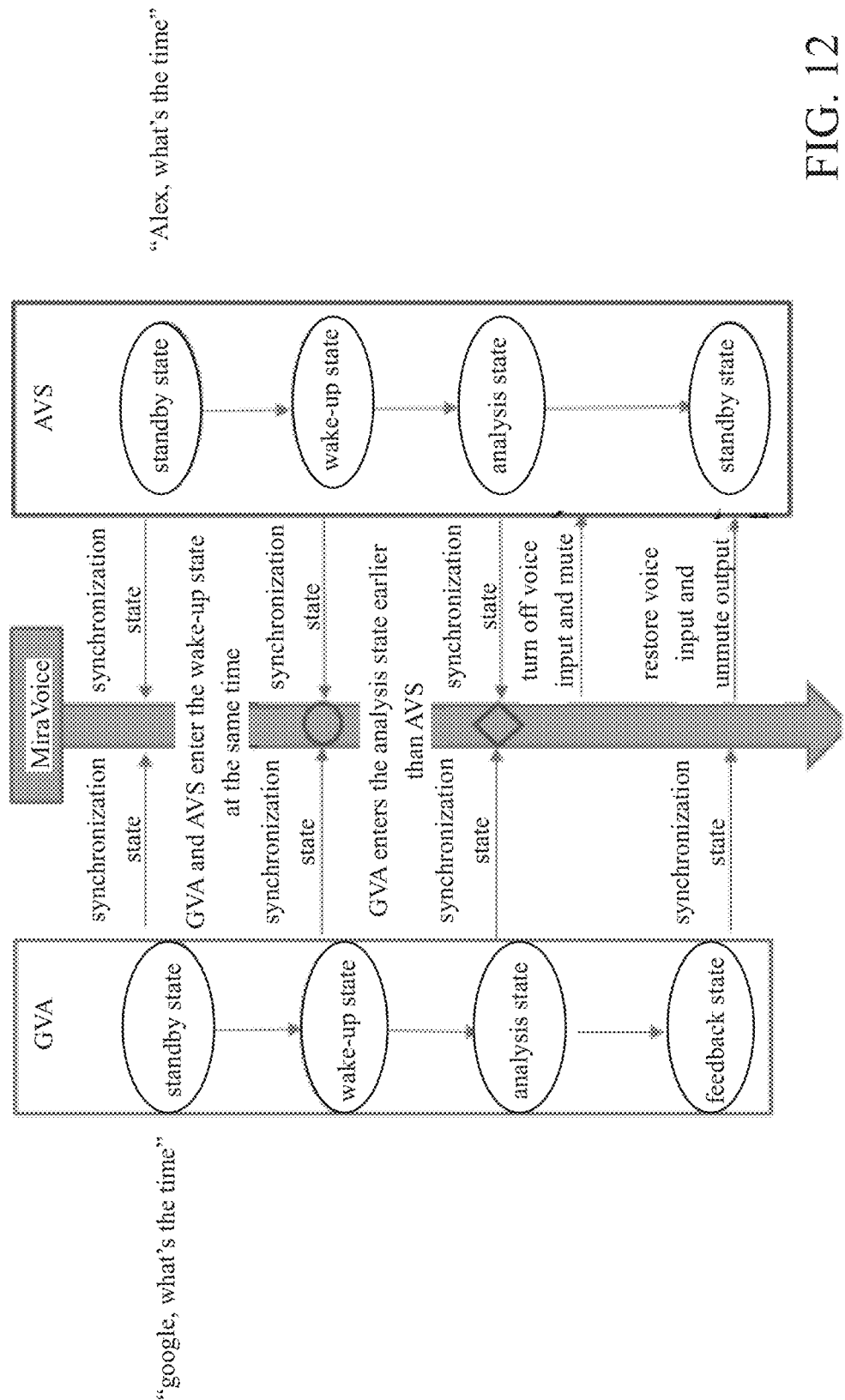
FIG. 12 is a principle schematic diagram of a voice interaction method of a voice device in accordance with some implementations of the present invention.

The following will introduce the third preset principle in detail—the non-interruptible analysis principle. Specifically, as shown in FIGS. 11 and 12, the voice interaction method of a voice device in this embodiment includes the following steps. It should be noted that the following step numbers are only configured to simplify the description, and are not intended to limit the execution order of the steps. The steps in this embodiment can be arbitrarily replaced without violating the technical idea of the present invention.

Step S401: determining working statuses of at least two voice modules

Step S402: If determining that one voice module is in the analysis state and the other voice module(s) is/are in the wake-up state or the standby state based on the working statuses of the two voice modules, selecting the voice module in the analysis state as the voice module for voice interaction, and suspending the voice interaction of the remaining voice module(s).

In some embodiments, the suspension of a voice module may include at least one of the following methods: pausing/interrupting/stopping the work of the voice module (for example, suspending the keyword recognition of the collected voice of the recording device); controlling the playback device not to play the playback content of the voice module (for example, pausing/stopping playing the playback content provided by the voice module, or muting the playback content provided by the voice module); keeping the current state of the voice module; restoring the voice module to the standby state; controlling the recording device not to provide the collected voice to the voice module; and disconnecting the voice module, etc. In the specific implementation, the appropriate suspension action can be selected according to the actual application scenario.

As an example, as shown in FIG. 12, in the case that a user requests two voice services at the same time, the switching module (marked as MiraVoice in FIG. 12) selects the voice module that enters the analysis state (Detecting) first as the voice module for voice interaction, and suspends the voice interaction of the remaining voice module(s) based on the judgment of who enters the analysis state first. In FIG. 12, the GVA voice service enters the analysis state (Detecting) first, so it is selected as the voice module for voice interaction, and the voice interaction of the AVS voice module is suspended. In the embodiment of FIG. 12, as an example, the way to suspend the AVS voice module is to restore the status of the AVS voice module to the standby state, and control the playback device not to play the playback content of the AVS voice module (for example, pausing/stopping playing the playback content provided by the voice module, or muting the playback content provided by the voice module), and control the recording device not to provide the collected voice to the AVS voice module. Optionally, in some embodiments, when the working status of the selected voice module (for example, the GVA voice module in FIG. 12) changes to the feedback state or the standby state, the voice interaction of the remaining voice module(s) can be restored to normal operation. In the embodiment of FIG. 12, as an example, the way of restoring the normal operation of the AVS voice module enables the AVS voice module to perform normal state transitions, control the playback device to play the playback content of the AVS voice module, and control the recording device to provide the collected voice to the AVS voice module. In this way, the remaining voice module(s) that are restored to normal operation can respond to the constraints of various preset principles provided by the present invention again.

Figure 13:
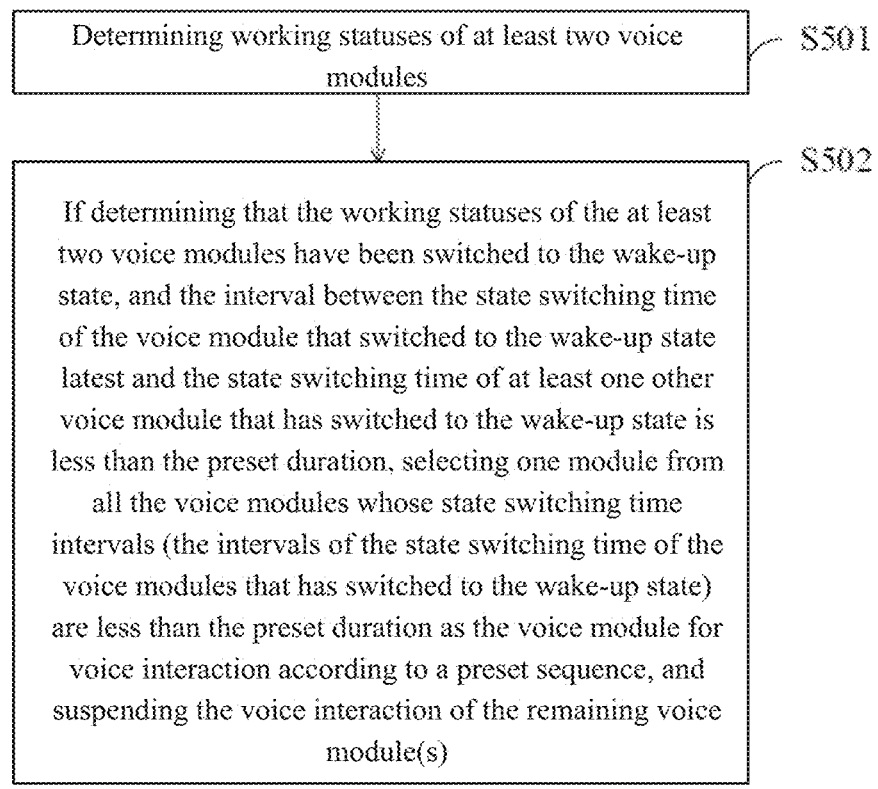
FIG. 13 is a flow chart of a voice interaction method of a voice device in accordance with some implementations of the present invention.
Figure 14:
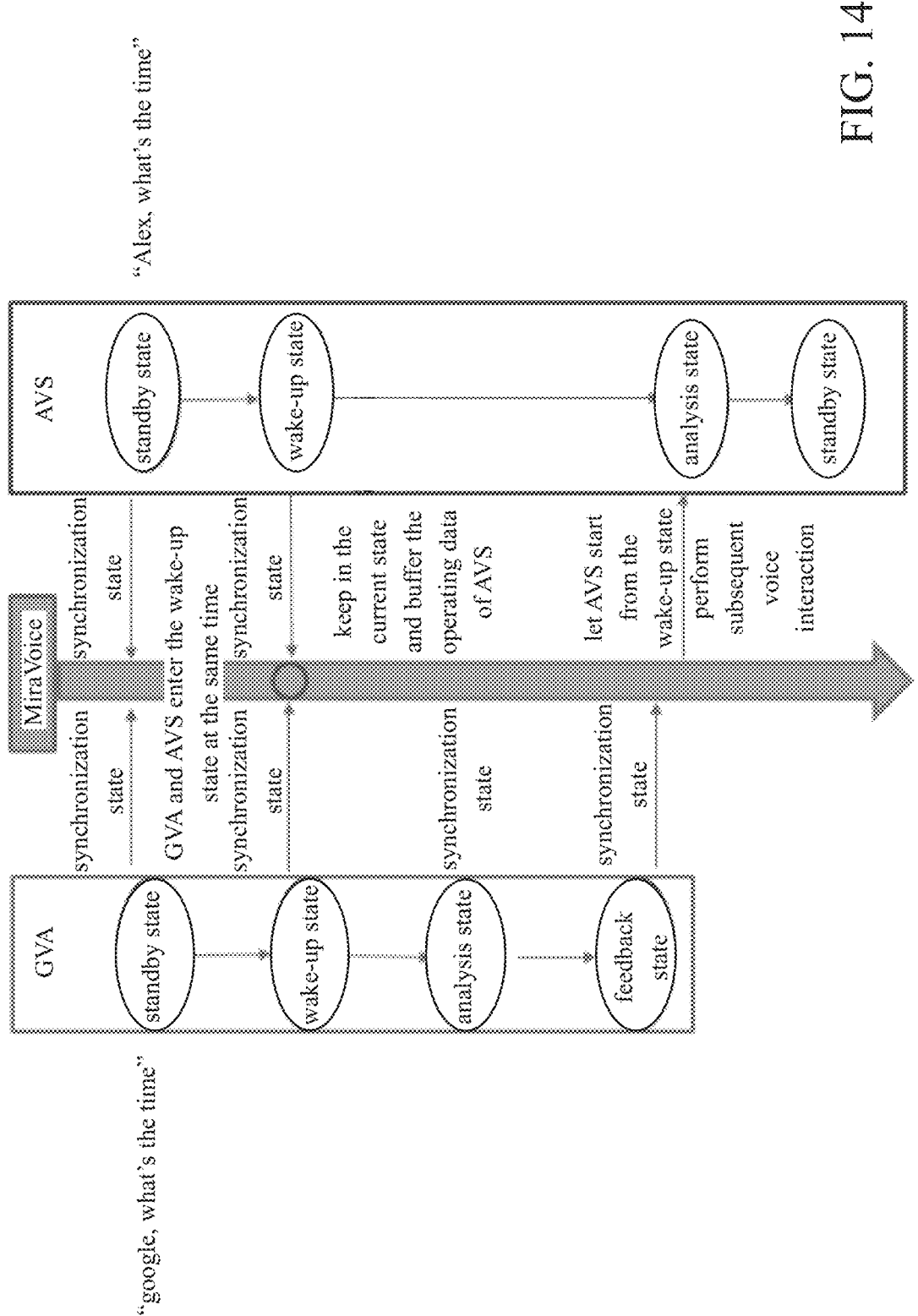
FIG. 14 is a flow chart of a voice interaction method of a voice device in accordance with some implementations of the present invention.

The following will introduce in detail the fourth preset principle—the step-by-step response principle. Specifically, as shown in FIGS. 13 and 14, the voice interaction method of a voice device in this embodiment includes the following steps. It should be noted that the following step numbers are only configured to simplify the description, and are not intended to limit the execution order of the steps. The steps in this embodiment can be arbitrarily replaced without violating the technical idea of the present invention.

Step S501: determining working statuses of at least two voice modules.

Step S502: if determining that the working statuses of at least two voice modules has been switched to the wake-up state, and the interval between the state switching time of the voice module that switched to the wake-up state latest and the state switching time of at least one other voice module that has switched to the wake-up state is less than the preset duration, selecting one voice module from all the voice modules whose state switching time intervals (the intervals of the state switching time of the voice modules that has switched to the wake-up state) are less than the preset duration as the voice module for voice interaction according to a preset sequence, and suspending the voice interaction of the remaining voice module(s).

As shown in FIG. 14, in the case that a user requests two voice services (the GVA and the AVS) at the same time, that is, the time interval between the voice modules corresponding to the two voice services to reach the wake-up state is shorter than the preset duration, the switching module (marked as MiraVoice in FIG. 14) first selects the voice module (for example, the GVA voice module) corresponding to one of the two voice services as the voice module for voice interaction, and suspends the voice interaction of the other voice module (for example, the AVS voice module). In some embodiments, the suspension of a voice module includes keeping the voice module in the current state and buffering the operating data of the voice module, so that when the corresponding voice module is subsequently selected as the voice module for voice interaction in a preset sequence, the subsequent voice interaction can be performed from the maintained state.

The preset sequence may be the sequence in which the voice modules switch to the wake-up state (the embodiment shown in FIG. 14 follows this sequence). Or the preset sequence may be the priority order of the voice modules. The preset sequence may also be the sequence formed by randomly arranging and combining the voice modules by the switching module.

If the currently selected voice module has been switched to the feedback state or the standby state, and the currently selected voice module is not the last voice module in the preset sequence, continuously selecting one voice module from all the voice modules whose state switching time intervals are less than the preset duration as the voice module for voice interaction according to the preset sequence, and suspending the voice interaction steps of the remaining voice module(s), until the selected voice module is the last voice module in the preset sequence. As an example, in the embodiment of FIG. 14, when the GVA voice module has been switched to the feedback state or the standby state, and since the GVA voice module is not the last voice module in the preset sequence, continuously selecting the AVS voice module as the voice module for voice interaction. In some embodiments, after the AVS voice module is selected as the voice module for voice interaction, the AVS voice module continues to perform subsequent state/states from the maintained wake-up state, that is, continues to perform analysis, response and other states.

Figure 15:
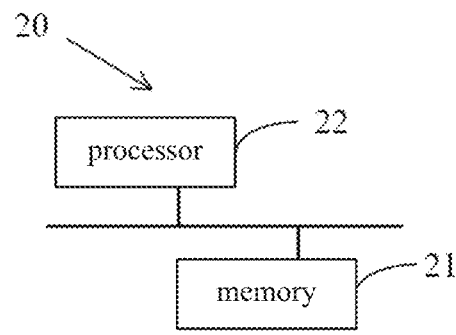
FIG. 15 is a structural schematic diagram of a voice device in accordance with some implementations of the present invention.

Please refer to FIG. 15. FIG. 15 is a structural schematic diagram of a voice device in accordance with some implementations of the present invention. A voice device 20 of the present invention includes a processor 22, recording device, and a playback device. The processor 22 is coupled to the recording device and the playback device. The processor 22 is configured to execute instructions to implement the method provided by any embodiment and any non-conflicting combination of the voice interaction method of the present invention.

The voice device 20 may be a terminal such as a mobile phone or a laptop, or may also be a server, or may also be an Internet of Things (IoT) device constructed as a local area network such as a refrigerator, and air conditioner, and a food wear device.

The processor 22 may also be referred to as a central processing unit (CPU). The processor 22 may be an integrated circuit chip with signal processing capabilities. The processor 22 may also be a general-purpose processor, a digital signal processor (DSP), an application specific integrated circuit (ASIC), a field programmable gate array (FPGA), or other programmable logic devices, discrete gates or transistor logic devices, discrete hardware components. The general-purpose processor may be a microprocessor, or the processor 22 may also be any conventional processor or the like.

The voice device 20 may further include a memory 21 for storing instructions and data required for the operation of the processor 22.

Figure 16:
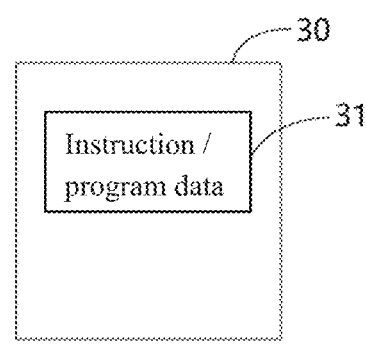
FIG. 16 is a structural schematic diagram of a computer-readable recording medium in accordance with some implementations of the present invention.

Please refer to FIG. 16. FIG. 16 is a structural schematic diagram of a computer-readable recording medium in accordance with some implementations of the present invention. The computer-readable recording medium 30 of the embodiment of the present invention stores instruction/program data 31. When the instruction/program data 31 is executed, the method provided by any one of the above-mentioned methods and any non-conflicting combination of the present invention is implemented. The instruction/program data 31 can be formed into a program file in the above-mentioned recording medium 30 in the form of a software program, so that a computer device (may be a personal computer, a server, or a network device, etc.) or a processor executes all or part of the steps of the various embodiments of the present invention. The aforementioned recording medium 30 includes: a U disk, a removable hard disk, a read-only memory (ROM), a random access memory (RAM), a magnetic disk or an optical disk, and other media that can store program codes, or devices such as a computer, a server, a mobile phone, and a tablet.

In the several embodiments provided by the present invention, it should be understood that the disclosed system, device, and method can be implement in other methods. For example, the device embodiments described above are merely illustrative, for example, the division of units is only a logical function division, and there may be other divisions in actual implementation. For example, multiple units or elements can be combined or integrated into another system, or some features may be omitted or not implemented. In addition, the displayed or discussed mutual coupling or direct coupling or communicatively connecting may be indirect coupling or communicatively connecting through some interfaces, device or units, and may be in electrical, mechanical, or other forms.

In addition, the functional units in the various embodiments of the present invention may be integrated into one processing unit, or each unit may exist alone physically, or two or more units may be integrated into one unit. The above-mentioned integrated unit can be realized either in the form of hardware or in the form of software functional unit.

Although the present invention is disclosed as above in the preferred embodiment, it is not intended to limit the scope of the present invention. Anyone with ordinary knowledge in the relevant technical field can make some changes and modifications without departing from the spirit and scope of the present invention. Therefore, the protection scope of the present invention shall be determined by the scope of the claims.

What is claimed is:

1. A voice interaction method of a voice device, wherein the voice device comprises at least two voice modules, and the voice interaction method comprises:
   determining working statuses of the at least two voice modules; and
   selecting one voice module from the at least two voice modules to execute the voice interaction and suspending the voice interaction of the remaining voice module (s) based on a preset principle and the working statuses of the at least two voice modules;
wherein the step of selecting one voice module from the at least two voice modules to execute voice interaction and suspending the voice interaction of the remaining voice module(s) based on the preset principle and the working statuses of the at least two voice modules comprises:
selecting a first voice module to execute the voice interaction and suspending the voice interaction of the remaining voice module(s) in response to the first voice module being the latest voice module that has entered a wake-up state or the first voice module being in an analysis state and the remaining voice module(s) having not yet entered the analysis state.

2. The voice interaction method as claimed in claim 1, wherein the step of selecting the first voice module to execute the voice interaction and suspending the voice interaction of the remaining voice module(s) in response to the first voice module being the latest voice module that has entered the wake-up state comprises:
if determining that at least one voice module is in the wake-up state and the remaining voice module(s) is/are in any one of an analysis state, a feedback state, or a standby state based on the working statuses of the at least two voice modules, selecting the voice module that entered the wake-up state latest to execute the voice interaction, and suspending the voice interaction of the remaining voice module(s).

3. The voice interaction method as claimed in claim 1, wherein the step of selecting the first voice module to execute the voice interaction and suspending the voice interaction of the remaining voice module(s) in response to the first voice module being in the analysis state and the remaining voice module(s) having not yet entered the analysis state comprises:
if determining that a voice module is in the analysis state and the other voice modules are in the wake-up state or the standby state based on the working statuses of the at least two voice modules, selecting the voice module in the analysis state to execute the voice interaction and suspending the voice interaction of the remaining voice module(s).

4. The voice interaction method as claimed in claim 1, wherein the step of suspending the voice interaction of the remaining voice modules comprises at least one of the following steps:
controlling a playback device not to play the playback content of the remaining voice module(s);
controlling the playback device not to provide collected voice to the remaining voice module(s);
suspending, interrupting, and stopping the work of the remaining voice module(s);
restoring the remaining voice module(s) to a standby state;
maintaining the current status(es) of the remaining voice module(s); and
disconnecting the remaining voice module(s).

5. The voice interaction method as claimed in claim 1, further comprising:
restoring the voice interaction of the remaining voice modules to normal operation in response to the working status of the currently selected voice module being changed to a feedback state or a standby state.

6. The voice interaction method as claimed in claim 5, wherein the step of restoring the voice interaction of the remaining voice modules to normal operation comprises at least one of the following methods:
controlling the playback device to play the playback content of the remaining voice module(s);
controlling the playback device to provide the collected voice to the remaining voice module(s);
enabling the remaining voice module(s) to normally switch the working status(es); and
reconnecting the remaining voice module(s).

7. A voice interaction method of a voice device, wherein the voice device comprises at least two voice modules, and the voice interaction method comprises:
determining working statuses of the at least two voice modules; and
selecting one voice module from the at least two voice modules to execute the voice interaction and suspending the voice interaction of the remaining voice module(s) based on a preset principle and the working statuses of the at least two voice modules;
wherein the step of selecting one voice module from the at least two voice modules to execute voice interaction and suspending the voice interaction of the remaining voice module(s) based on the preset principle and the working statuses of the at least two voice modules comprises:
if determining that the working statuses of at least two voice modules has been switched to a wake-up state, and the time interval between a state switching time of the voice module that switched to the wake-up state latest and a state switching time of at least one other voice module that has switched to the wake-up state is less than a preset duration based on the working statuses of the at least two voice modules, selecting one voice module from all the voice modules whose state switching time intervals are less than the preset duration to execute the voice interaction according to a preset sequence, and suspending the voice interaction of the remaining voice module(s).

8. The voice interaction method as claimed in claim 7, wherein the step of suspending the voice interaction of the remaining voice module(s) comprises:
keeping the remaining voice module(s) in the current state and buffering the operating data of the remaining voice module(s).

9. The voice interaction method as claimed in claim 7, further comprising:
if the currently selected voice module has been switched to a feedback or a standby state, and the currently selected voice module is not the last voice module in the preset sequence, repeating the steps of selecting one voice module from all the voice modules whose state switching time intervals are less than the preset duration to execute the voice interaction according to the preset sequence and suspending the voice interaction of the remaining voice module(s), until the selected voice module is the last voice module in the preset sequence.

10. The voice interaction method as claimed in claim 9, further comprising:
when selecting one voice module from all the voice modules whose state switching time intervals are less than the preset duration to execute the voice interaction according to the preset sequence, enabling the selected voice module for subsequent voice interactions from a maintained state.

11. A voice device, comprising:
a recording device;
a playback device;

at least two voice modules, each of which is communicatively connected with the recording device and the playback device;
a switching module, communicatively connected with the at least two voice modules, the recording device, and the playback device, and configured to execute the following steps:
determining working statuses of the at least two voice modules; and
selecting one voice module from the at least two voice modules to execute the voice interaction and suspending the voice interaction of the remaining voice module(s) based on a preset principle and the working statuses of the at least two voice modules;
wherein when executes the step of selecting one voice module from the at least two voice modules to execute voice interaction and suspending the voice interaction of the remaining voice module(s) based on the preset principle and the working statuses of the at least two voice modules, the switching module is configured to:
selects a first voice module to execute the voice interaction and suspending the voice interaction of the remaining voice module(s) in response to the first voice module being the latest voice module that has entered a wake-up state or the first voice module being in an analysis state and the remaining voice module(s) having not yet entered the analysis state.

12. The voice device as claimed in claim 11, wherein when executes the step of suspending the voice interaction of the remaining voice modules, the switching module is configured to execute at least one of the following steps:
controlling a playback device not to play the playback content of the remaining voice module(s);
controlling the playback device not to provide collected voice to the remaining voice module(s);
suspending, interrupting, and stopping the work of the remaining voice module(s);
restoring the remaining voice module(s) to a standby state;
maintaining the current status(es) of the remaining voice module(s); and
disconnecting the remaining voice module(s).

13. The voice device as claimed in claim 11, wherein the switching module is further configured to:
restores the voice interaction of the remaining voice modules to normal operation in response to the working status of the currently selected voice module being changed to a feedback state or a standby state.

14. A voice device, comprising:
a recording device;
a playback device;
at least two voice modules, each of which is communicatively connected with the recording device and the playback device;
a switching module, communicatively connected with the at least two voice modules, the recording device, and the playback device, and configured to execute the following steps:
determining working statuses of the at least two voice modules; and
selecting one voice module from the at least two voice modules to execute the voice interaction and suspending the voice interaction of the remaining voice module(s) based on a preset principle and the working statuses of the at least two voice modules;
when executes the step of selecting one voice module from the at least two voice modules to execute voice interaction and suspending the voice interaction of the remaining voice module(s) based on the preset principle and the working statuses of the at least two voice modules, the switching module is configured to:
if determines that the working statuses of at least two voice modules has been switched to a wake-up state, and the time interval between a state switching time of the voice module that switched to the wake-up state latest and a state switching time of at least one other voice module that has switched to the wake-up state is less than a preset duration based on the working statuses of the at least two voice modules, selects one voice module from all the voice modules whose state switching time intervals are less than the preset duration to execute the voice interaction according to a preset sequence, and suspends the voice interaction of the remaining voice module(s).

15. The voice device as claimed in claim 11, wherein when executes the step of suspending the voice interaction of the remaining voice module(s), the switching module is configured to:
keeps the remaining voice module(s) in the current state and buffers the operating data of the remaining voice module(s).

* * * * *